(12) United States Patent
Smith et al.

(10) Patent No.: US 8,794,156 B1
(45) Date of Patent: Aug. 5, 2014

(54) SAFETY PROJECTILE FOR FIREARMS

(71) Applicant: The United States of America as Represented by the Secretary of the Army, Washington, DC (US)

(72) Inventors: Brian J. Smith, Huntsville, AL (US); Kevin D. Kennedy, Huntsville, AL (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 43 days.

(21) Appl. No.: 13/784,471

(22) Filed: Mar. 4, 2013

(51) Int. Cl.
*F42B 12/34* (2006.01)
*F42B 10/50* (2006.01)
*B60T 1/16* (2006.01)

(52) U.S. Cl.
CPC .. *F42B 10/50* (2013.01); *B60T 1/16* (2013.01)
USPC ............................ 102/517; 102/529; 102/498

(58) Field of Classification Search
CPC ............ F42B 12/34; F42B 10/50; B60T 1/16; B64D 17/80; B64G 1/62
USPC ................... 102/517, 501, 529, 498; 244/113
See application file for complete search history.

(56) References Cited

U.S. PATENT DOCUMENTS

| | | | |
|---|---|---|---|
| 2,761,636 A | 9/1956 | Finlay | |
| 4,075,946 A * | 2/1978 | Deffayet et al. | 102/518 |
| 4,911,080 A | 3/1990 | Leeker et al. | |
| 8,096,243 B2 | 1/2012 | Glasser | |
| 8,220,746 B1 * | 7/2012 | Stecko et al. | 244/135 A |
| 8,616,496 B2 * | 12/2013 | Hardy et al. | 244/113 |
| 2012/0011996 A1 * | 1/2012 | Glasson | 89/36.17 |

* cited by examiner

*Primary Examiner* — Michael David
(74) *Attorney, Agent, or Firm* — Michael K. Gray

(57) ABSTRACT

A projectile package loaded in a firearm includes a projectile having a rod attached to its rear region. The rod is attached to a drag member or vanes having elastic properties. When fired, the projectile is expelled from the barrel of the firearm. Upon exiting the barrel and until the projectile reaches its effective range, reactionary air forces caused by the projectile traveling through the air result in the elastic vanes orienting themselves in a tight formation behind the rear region of the projectile. As a result, the vanes do not detrimentally affect the aerodynamics of the projectile's flight within the effective range of the projectile. However, once the effective range of the projectile has been exceeded, the slower velocity of the projectile causes the elastic vanes to laterally fan or spread out so as to impede the forward progress of the projectile.

15 Claims, 6 Drawing Sheets

SAFETY PROJECTILE FOR FIREARMS

DEDICATORY CLAUSE

The invention described herein may be manufactured, used and licensed by or for the U.S. Government for U.S. Government purposes without payment of any royalties thereon.

BACKGROUND OF THE INVENTION

1. Field of the Invention

The present invention pertains to projectiles such as bullets, shotgun slugs and the like that are fired from a firearm.

2. Discussion of the Background

The maximum range of a projectile fired from a firearm is much greater than the effective range of the projectile. The effective range of a projectile is understood to be the range where the projectile's speed and accuracy are within its effective design parameters. As a fired projectile travels beyond a certain distance, the speed and accuracy of the projectile are diminished to levels below that for which the projectile was designed.

However, a projectile that travels past its effective range without hitting an intended target can still pose an extreme hazard to people and property located further down range. For example, a rifle bullet having an effective range of 300 yards may have an actual or maximum range of over two miles and can be extremely lethal after traveling for over a mile.

Thus, a weapon's maximum range must be considered before deciding to use the weapon in a given environment or setting. Big game hunting requires the use of weapons having high muzzle velocities. Yet, the maximum range of high-powered rifles creates a degree of danger even in rural settings. Mission success for police and military actions can require the use of high muzzle velocity weapons in densely populated urban areas where safety concerns become all the more obvious.

In some regions of the United States, no center-fire rifles are allowed for large game hunting and such hunting has been restricted to shotguns. Although shotgun slugs do not travel as far as a rifle bullet, shotgun-fired slugs are less accurate. Thus, even with decreased range, decreased accuracy is a cause for safety concerns.

SUMMARY OF THE INVENTION

The present invention allows a projectile fired from a firearm to achieve its full effective range while greatly reducing the projectile's maximum range. This reduction in the maximum range of the weapon greatly augments safety where the weapon is used. The present invention has particular applicability for hunting near populated areas and in military and police actions in urban settings.

In the present invention, a projectile fired from a firearm is allowed to perform as intended within its effective range with the forward progress of the projectile being severely impeded and retarded thereafter such that the maximum range of the projectile is severely reduced. This reduction in forward progress after traveling an effective-range distance is accomplished by attaching vanes or drag-creating members to the back of the projectile, with the vanes being designed to expand once the effective range of the projectile has been reached.

The present invention is a projectile package or projectile capsule which includes a projectile to be fired from a firearm, such as in a shotgun shell or bullet cartridge.

The projectile package includes a projectile having a front portion and a front tip. The body of the projectile is located between the front portion and a rear portion of the projectile. A rod is positioned to the rear of rear portion with a front end of the rod extending into the projectile and being securely connected thereto. The rod has a rear end positioned the furthest distance from the rear of rear portion of the projectile. The rod is aligned with a horizontal axis which extends through the center of the projectile and through the front tip of the projectile. The projectile is secured to a container, such as a shell case or casing. Vanes are connected to the rod. Propellant such as gunpowder is located within the container to the rear of the projectile. The container includes a primer.

When the projectile package is loaded in a firearm, once the primer is struck, the propellant is ignited causing the projectile to be expelled from the barrel of the firearm. Upon exiting the barrel and until the projectile reaches its effective range, the reactionary air forces caused by the projectile traveling through the air, cause the vanes to be positioned behind the rear of the projectile. Thus, the vanes do not detrimentally affect the aerodynamics of the projectile's flight within the effective range of the projectile. The vanes have elastic properties. Once the effective range of the projectile has been exceeded, the slower velocity of the projectile results in the vanes laterally spreading out so as to impede the forward progress of the projectile.

DESCRIPTION OF THE DRAWINGS

A more complete appreciation of the invention and many of the attendant advantages thereof will be readily obtained by reference to the following detailed description when considered in connection with the accompanying drawings.

DETAILED DESCRIPTION

Figure 1:
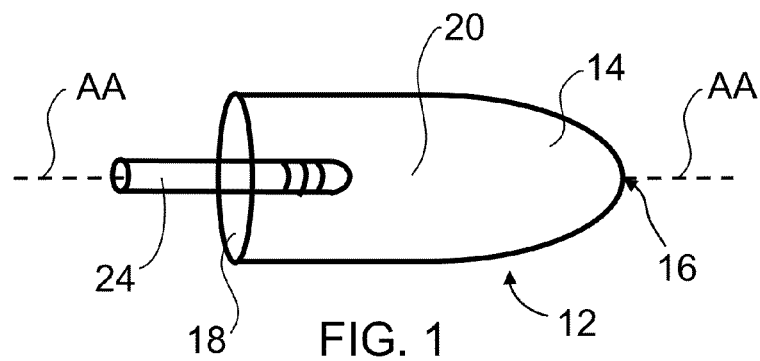
FIG. 1 is a perspective view of a safety projectile made in accordance with the present invention showing a rod extending from the rear portion of the projectile with the rod being aligned with a horizontal axis.

With reference to FIG. 1, a projectile 12 in accordance with the present invention has a front portion 14, a rear portion 18 and a body 20. The body 20 is located between the front portion 14 and rear portion 18 of projectile 12. A front tip 16 is positioned at the forward most point of the front region 14. A rod 24 has a front end 25 and a rear end 27. The front end of rod 24 extends into the projectile 14 through a center hole 22 (FIG. 2) located in the middle of rear portion 18. The rear end 27 of rod 24 is positioned to the rear of rear portion 18. Rod 24 is aligned on horizontal axis AA. Horizontal axis AA extends through rod 24 and through the front tip 16 of projectile 12. Thus, horizontal axis AA extends horizontally through the center of projectile 12.

Figure 2:
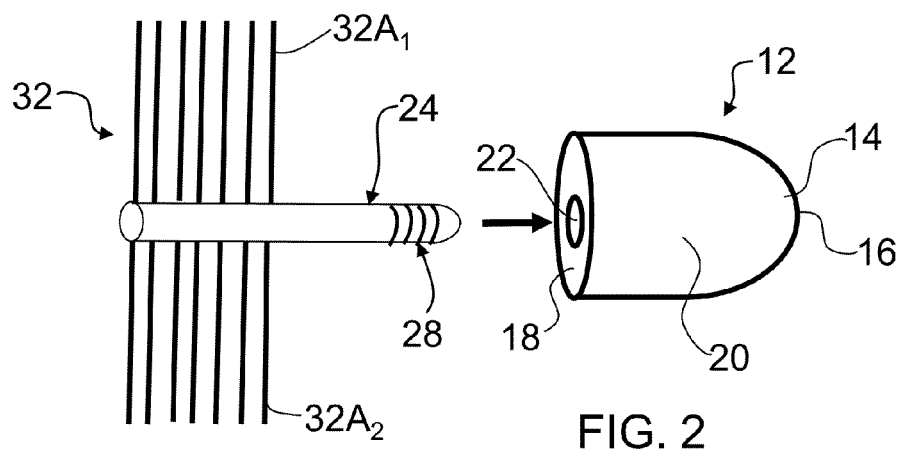
FIG. 2 is an exploded view demonstrating that the projectile and rod of the present invention can be connected by a screw-type assembly.
Figure 3:
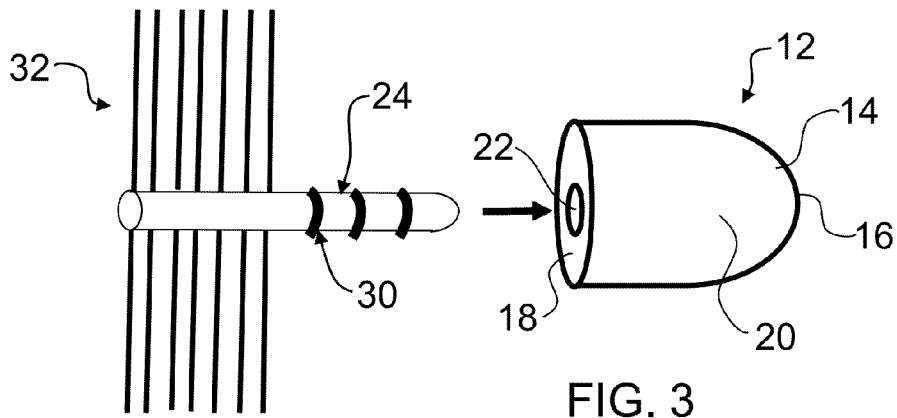
FIG. 3 is an exploded view demonstrating that the projectile and rod of the present invention can be connected by a press-fit assembly.

FIG. 2 and FIG. 3 demonstrate that rod 24 can be secured to projectile 12 by a screw-type connection or by press-fitting. Other methods can be used to create the rod 24 and projectile 12, including form molding.

In reference to FIG. 2, rod 24 is provided with screw threads 28 for screwed connection with projectile 12. In FIG. 2, projectile 12 is provided with grooves (not shown) for accommodating the screw threads 28. Rod 24 is provided with a plurality of vanes 32, which include vanes $32A_1$ and $32A_2$. The vanes or drag-creating members 32 are positioned to the rear of projectile 12.

In FIG. 3, rod 24 is provided with raised rings 30 for purposes of a press-fit connection with projectile 14. When rod 24 is press-fit into center hole 22, the raised rings 30 allow for a secure connection.

The projectile 12 can be made of lead or other metals or alloys and is not limited to a metal composition. Plastic projectiles or projectiles made from other structurally suitable compositions may be used.

Figure 4:
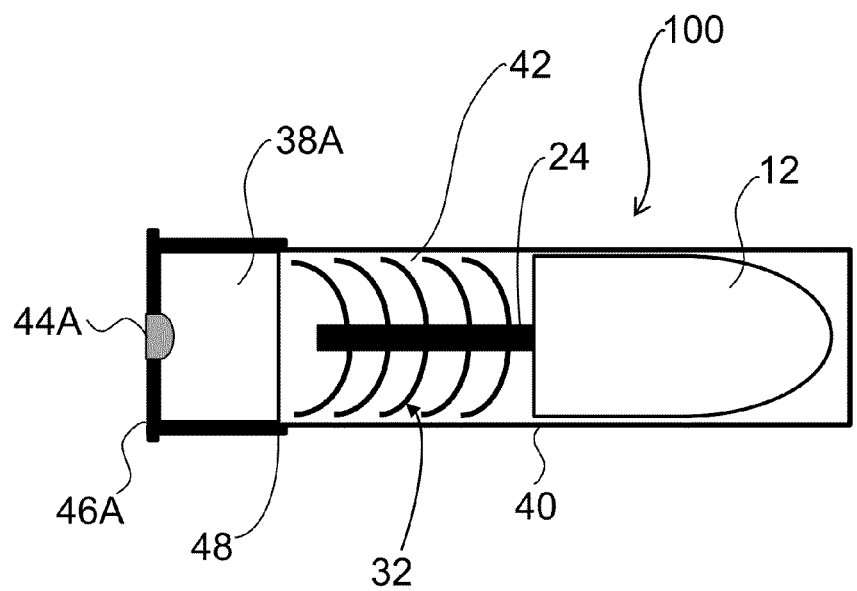
FIG. 4 is an x-ray-side view of a shell made in accordance with the present invention.

In FIG. 4, projectile 12 is positioned within a housing or shell case 40. Propellant or gun powder 38A is provided within a metal head 48 (although the head 48 could be made of a material other than metal). Vanes 32 on rod 24 are positioned to the rear of projectile 12 in a vane accommodating region 42 of shell 40. A primer 44A is located at the center of the rim region 46A. Rim region 46A is attached to head 48. In accordance with the present invention, the projectile 12, rod 24, vanes 32, shell case 40, propellant 38A, and head 48 form a projectile package or shotgun shell 100.

Figure 5:
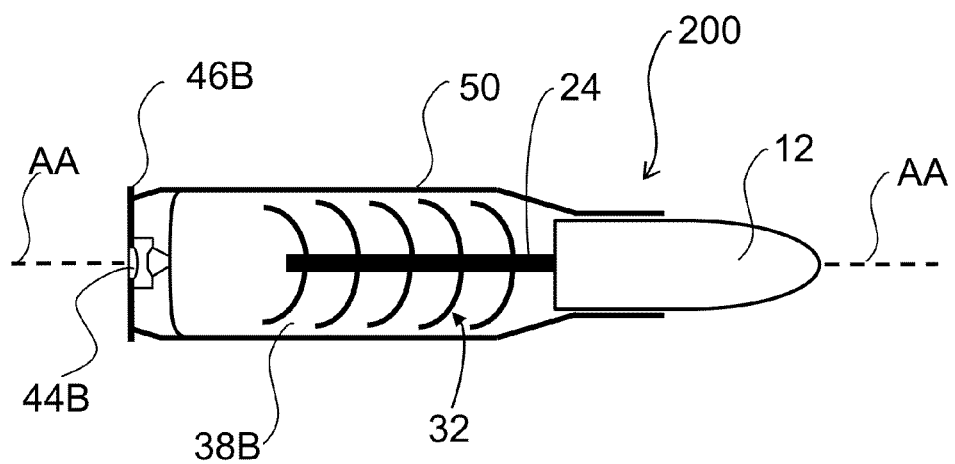
FIG. 5 is an x-ray-side view of a bullet cartridge made in accordance with the present invention.

In FIG. 5, a projectile package or bullet cartridge 200 is provided with a projectile 12 connecting to rod 24 to which is secured vanes 32. The vanes 32 are positioned to the rear of projectile 12 and are positioned within housing or case 50 in which the rear 18 of projectile 12 is securely attached or inserted. The vanes 32 are positioned within a portion 52 of casing 50 which is filled with gun powder or propellant 38B. The propellant 38B is connected to a primer 44B centered at the rear of rim region 46B.

Figure 6:
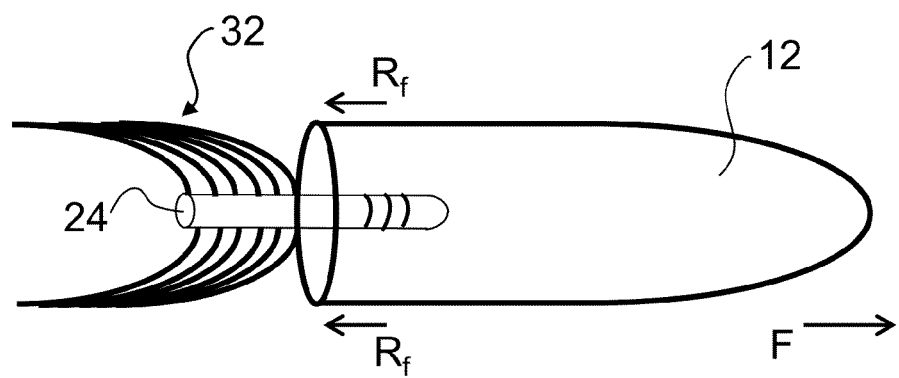
FIG. 6 is a side view of a safety projectile of the present invention in flight just after having been fired from a gun but before exceeding the projectile's effective range.

With reference to FIG. 6, when a firearm utilizing a shell 100 (FIG. 4) or bullet cartridge 200 (FIG. 5) is fired, the projectile 12 exits the gun barrel and proceeds in a forward direction F. The reaction force $R_f$ resulting from projectile 12 rapidly moving through the air causes vanes 32 to bend behind the rear 18 of projectile 12 so as not to impede the forward progress of the projectile 12. Once the effective range of the projectile has been reached such that the speed of travel of the projectile is diminished, the reaction force $R_f$ is diminished.

Figure 7:
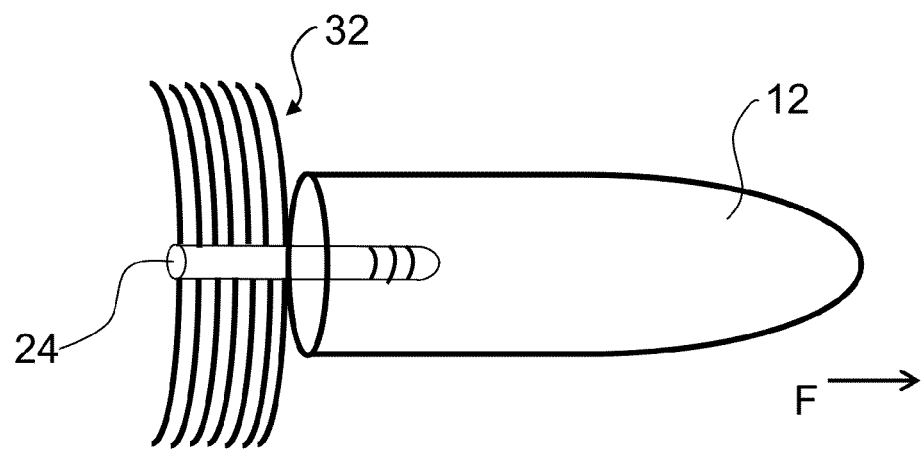
FIG. 7 is a side view of a safety projectile of the present invention in flight after having exceeded its effective range but before coming to rest.

As the reaction force $R_f$ is reduced, the elastic properties of vanes 32 causes the vanes to expand or fan out as shown in FIG. 7. The vanes 32 acts as a sail which drastically impedes the forward progress of the projectile 12 by creating drag. The vanes 32 cause projectile 12 to prematurely fall to the ground well before the maximum range of the projectile is achieved.

In a prototype of the present invention, the vanes 32 were constructed of a polymer (plastic) material, although other materials having appropriate elastic qualities could be used. The polymer or material selected for the vanes will depend on the velocity of the projectile and the projectile's effective maximum range. The material's modulus of elasticity will determine the restoring force required to expand the vanes and effect a termination of the projectile's flight. The modulus of elasticity can range from 350-3500 mega Pascal's (MPa).

The vanes can be made by injection molding and cutting of a ribbon or thin rod of the polymer to the required length. Injection molding of the rod and vanes in a simultaneous operation or mechanically attaching the vanes into holes or cutouts in the rod are two methods which can be used to affix the vanes to the rod, although the vanes can be attached to the rod by other methods. Attaching vanes by hole or cutouts is similar to a technique used to construct brooms and paint brushes. The elastic properties of the vanes are selected in accordance with muzzle speed, with the length of the vanes being necessarily limited due to packaging constraints.

Figure 8:
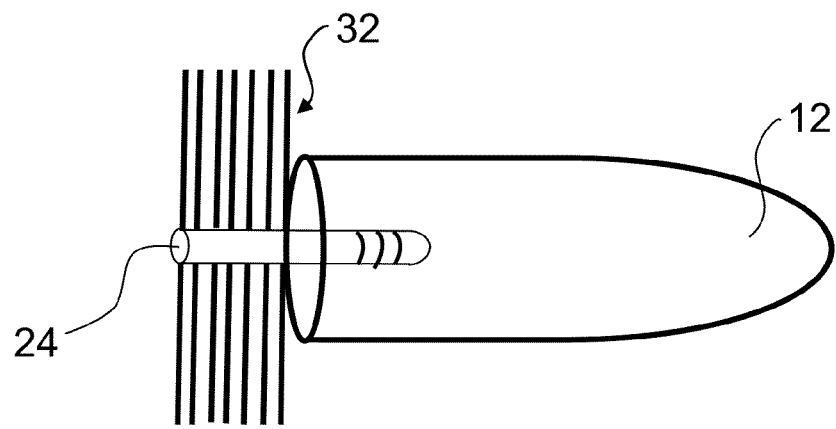
FIG. 8 is a side view of a safety projectile of the present invention which has finally come to rest after having been fired from a firearm.

In FIG. 8, the vanes 32 are fully extended and are not being met with wind resistance. Thus, FIG. 8 is demonstrative of a fired projectile 12 which has come to rest.

Figure 9:
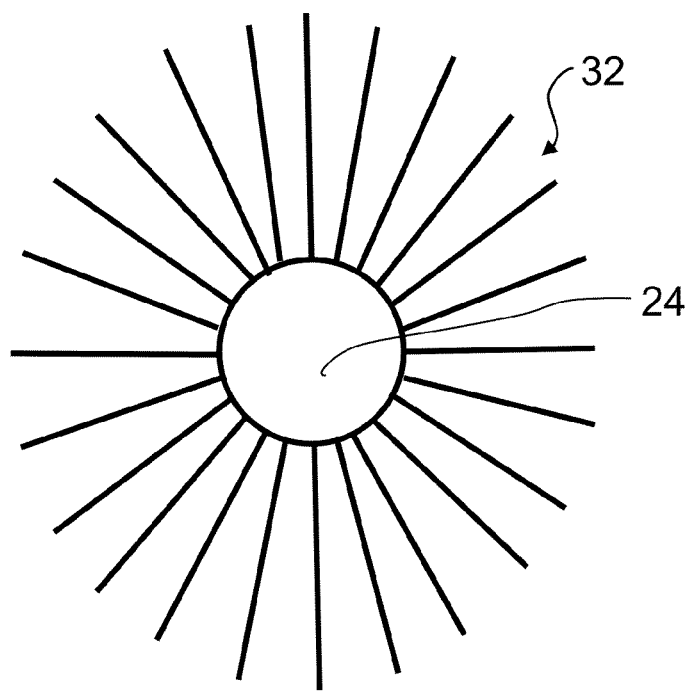
FIG. 9 is a rear view of the fully extended vanes of the safety projectile of the present invention.

FIG. 9 is a rear view of rod 24 with vanes 32 being in a fully extended, fanned-out position.

Figure 12:
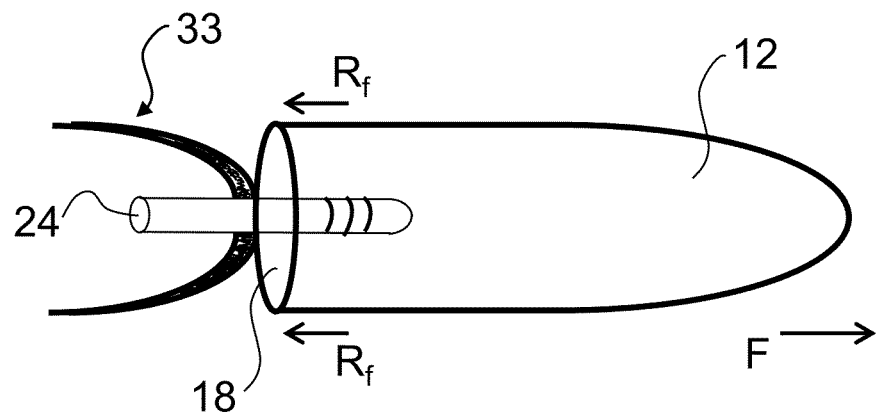
FIG. 12 is a side view of a safety projectile of the present invention in flight just after having been fired from a gun but before exceeding the projectile's effective range, with the safety projectile employing a single elastic sail or drag member 33.
Figure 13:
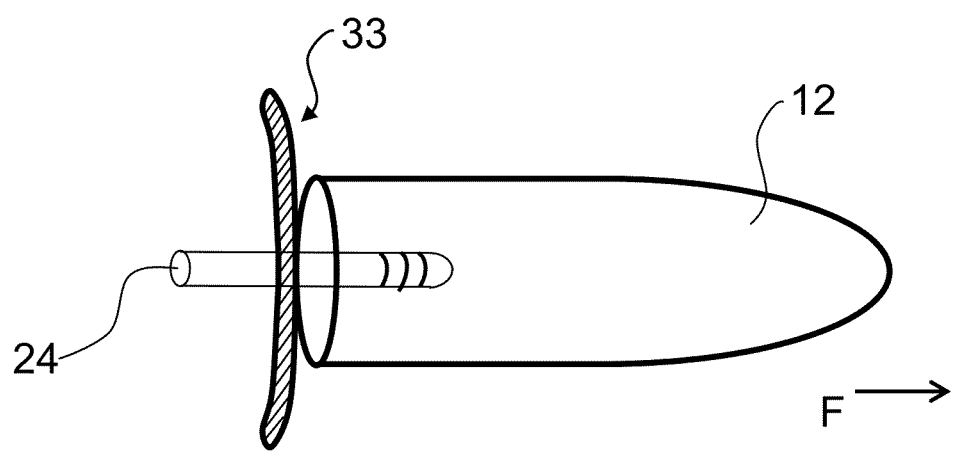
FIG. 13 is a side view of a safety projectile of the present invention in flight after having exceeded its effective range but before coming to rest, with the single elastic sail or drag member fully deployed.

With reference to FIG. 12, the teachings of the present invention can be utilized in a single elastic sail or drag member 33 which is attached to rod 24 connecting to projectile 12. The drag member 33 has an elasticity such that when the projectile is within its effective range, after having been fired from the firearm, reaction forces $R_f$ cause the drag member 33 to assume a protected position behind the rear portion 18 of the projectile 12 so that the aerodynamic properties of the projectile are not detrimentally affected. After the projectile 12 has exceeded its effective range, and the reaction forces $R_f$ are reduced as a result of a reduction in speed, the drag member 33 laterally spreads out so as to impede the forward progress of the projectile.

Figure 10:
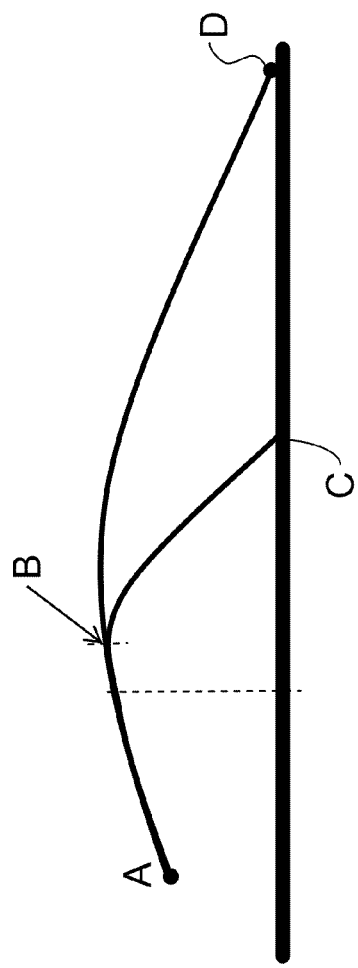
FIG. 10 is a graphical illustration comparing the distance traveled of a projectile equipped with vanes in accordance with the present invention and of a like projectile not so equipped.

In FIG. 10, the graphical illustration shows a point A which is the starting point of a bullet's trajectory. The bullet reaches the end of its effective range at point B. If the bullet is of a type which utilizes the present invention, the bullet comes to rest at point C. If the bullet is not constructed in accordance with the present invention, the same caliber of bullet fired from the same weapon with the same amount of propellant will land at point D.

Figure 11:
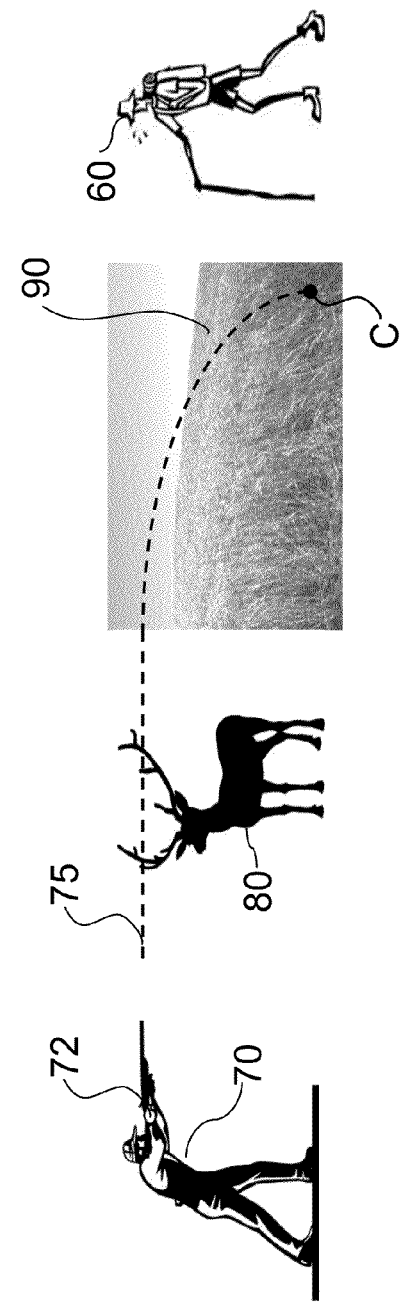
FIG. 11 demonstrably portrays, in accordance with the present invention, how a missed shot fired from a hunter's rifle falls harmlessly to the ground before endangering a pedestrian in the line of fire.

The practical effects of the present invention are demonstrated in FIG. 11 where a hunter 70 is depicted firing his rifle 72 at a deer 80. In that the aim of the hunter 70 was off, the resulting bullet path 75 misses the deer 80. However, since the hunter was utilizing a bullet made in accordance with the teachings of the present invention, the bullet landed at point C just short of a field of wheat 90.

What the hunter could not appreciate when he fired the gun was that a pedestrian 60 was walking nearly a mile away on the other side of the field of wheat 90. If the hunter 70 had not been using a bullet in accordance with the present invention, the bullet which missed the deer could have struck the pedestrian 60.

In a prototype of the present invention, a rigid central rod had plastic polymer string attached to it at various circumferential and axial locations. These strings were grouped and aligned to form vanes. This assembly was inserted into the base of a 12 gauge, 0.55 inch diameter slug. The rod extended the overall length of the slug by 70%. When fully extended, the vanes had a radius that was 70% greater than the radius of the slug. For the prototype, four sets of vanes were separated by 90 degrees.

However, it is understood that the invention may be practiced with any number of vanes or sets of vanes spaced apart at various distances and angles, and as demonstrated in the embodiment of FIG. 12, the vanes could be lumped together into a single circumferential mass so as to form a single sail or drag member.

As a proof of concept and verification of range reduction, both three-dimensional computational fluid dynamic (CFD) drag calculations and one-dimensional degree of freedom (1-DOF) flight predictions were made to examine the impact of the vane assembly on the flight path of the projectile. This research project examined the effects of the increased drag on the projectile, caused by the vanes as they extended into the flow field, at various speeds and locations along the flight path.

The results from the simulation indicated no significant effects on range/altitude/velocity within the effective 0 to 300 meter range. Downstream of the effective range the maximum range was reduced by up to 40%. What was further detected was that the vanes, like the vanes of an arrow, actually contributed to increasing the accuracy of the projectile within the projectile's effective range.

The simulation results and prototype demonstrated that while significantly reducing the actual range of a projectile, the present invention does not detrimentally affect the performance of the projectile within its effective range and actually enhances accuracy within the effective range.

The present invention has applicability to rifle and pistol bullets and to shotgun slugs; however, the invention is not limited to such originations or applications.

Accordingly, modifications are possible without deviating from the spirit of the present invention. Thus, the scope of the present invention is limited only by the claim language which follows hereafter.

What is claimed is:

1. A projectile package for loading into a firearm, comprising:
   a projectile to be fired from the firearm, said projectile having a front portion, a rear portion, and a body located between said front portion and rear portion of said projectile;
   a rod connected to said rear portion of said projectile such that said rod is aligned on a horizontal axis that extends through said rod and through said rear portion, through said body and through said front portion of said projectile;
   a plurality of vanes connected to said rod;
   a housing for accommodating said rod and said plurality of vanes;
   a propellant located within said housing; and wherein said plurality of vanes have an elasticity such that when said projectile has traveled its effective range after having been fired from the firearm, said plurality of vanes laterally spread out so as to impede the forward progress of said projectile.

2. A projectile package according to claim 1 wherein:
   said projectile is attached to said housing prior to being fired from said firearm.

3. A projectile package according to claim 2, wherein:
   said housing is a cartridge.

4. A projectile package according to claim 3, wherein:
   said projectile is a bullet.

5. A projectile package according to claim 1, wherein:
   said housing is a shell case.

6. A projectile package according to claim 5, wherein:
   said projectile is a shotgun slug and is located within said shell case prior to being fired from said firearm.

7. A projectile package according to claim 1, further comprising:
   a primer for activating said propellant.

8. A projectile package according to claim 6, wherein:
   said propellant surrounds said plurality of vanes within a vane accommodating region of said shell case.

9. A projectile package according to claim 1, wherein:
   said propellant is positioned rearward of said plurality of vanes within said housing.

10. A projectile package according to claim 4, wherein:
    said propellant surrounds said plurality of vanes within said housing.

11. A projectile package according to claim 6, wherein:
    said propellant is positioned rearward of said plurality of vanes within said housing.

12. A projectile package according to claim 1, wherein:
    said propellant is gunpowder.

13. A projectile package for loading into a firearm, comprising:
    a projectile to be fired from the firearm, said projectile having a front portion, a rear portion, and a body located between said front portion and rear portion of said projectile;
    a rod connected to said rear portion of said projectile such that said rod is aligned on a horizontal axis that extends through said rod and through said rear portion, through said body and through said front portion of said projectile;
    at least one drag member connected to said rod;
    a housing for accommodating said rod and said at least one drag member;
    a propellant located within said housing; and wherein said at least one drag member has an elasticity such that when said projectile is within its effective range, after having been fired from the firearm, reaction forces cause said at least one drag member to assume a protected position behind the rear portion of said projectile, and after said projectile has exceeded its effective range said at least one drag member spreads out so as to impede the forward progress of said projectile.

14. A projectile package according to claim 13, wherein the projectile package is a bullet cartridge.

15. A projectile package according to claim 13, wherein the projectile package is a shotgun shell.

* * * * *